US012229398B2

(12) United States Patent
Govil et al.

(10) Patent No.: US 12,229,398 B2
(45) Date of Patent: Feb. 18, 2025

(54) SMART DESK WITH GESTURE DETECTION AND CONTROL FEATURES

(71) Applicant: SmartDesk Inc, Brooklyn, NY (US)

(72) Inventors: Saagar Govil, Brooklyn, NY (US); Joe Novelli, Oakland, NJ (US); Ankeet Ghosh, Levittown, NY (US)

(73) Assignee: SMARTDESK INC, Brooklyn, NY (US)

( * ) Notice: Subject to any disclaimer, the term of this patent is extended or adjusted under 35 U.S.C. 154(b) by 513 days.

(21) Appl. No.: 17/221,264

(22) Filed: Apr. 2, 2021

(65) Prior Publication Data
US 2021/0223951 A1   Jul. 22, 2021

Related U.S. Application Data

(63) Continuation of application No. 15/926,283, filed on Mar. 20, 2018, now Pat. No. 10,969,956.

(51) Int. Cl.
*G06F 3/0488* (2022.01)
*G06F 3/041* (2006.01)
(Continued)

(52) U.S. Cl.
CPC ........ *G06F 3/04883* (2013.01); *G06F 3/0412* (2013.01); *G06F 3/0416* (2013.01); *G06F 3/0484* (2013.01)

(58) Field of Classification Search
CPC .. G06F 3/0412; G06F 3/0416; G06F 3/04162; G06F 3/0484; G06F 3/0486; G06F 3/0488; G06F 3/04883
See application file for complete search history.

(56) References Cited

U.S. PATENT DOCUMENTS

| 9,122,249 B2 | 9/2015 | Lyons et al. | |
| 2007/0177803 A1* | 8/2007 | Elias | G06F 3/04895 382/188 |

(Continued)

FOREIGN PATENT DOCUMENTS

| CN | 104281402 A | * 1/2015 | ............ G06F 3/01 |
| CN | 206423789 | 8/2017 | |

OTHER PUBLICATIONS

International Search Report of the International Searching Authority mailed on May 17, 2018, issued in connection with International Application No. PCT/US2018/23304 (3 pages).

(Continued)

*Primary Examiner* — Stacy Khoo
(74) *Attorney, Agent, or Firm* — Woods Oviatt Gilman LLP; Dennis B. Danella, Esq.

(57) ABSTRACT

A smart desk having one or more touch displays is provided. The smart desk can be programmed with one or more touch or touchless gestures for executing computer commands or manipulating content displayed on the one or more touch displays. Touchless gestures can be executed by the smart desk by tracking a user's movements with a motion sensor. The touch gestures can instruct the smart desk to transfer content between the one or more touch displays, expand content on the one or more touch displays, close a tab or a window, minimize a window, and/or switch between applications. The touchless gestures can include copy, paste, scroll, screen shot, page turn, and/or zoom in or out.

13 Claims, 18 Drawing Sheets

(51) Int. Cl.
  *G06F 3/0484*   (2022.01)
  *G06F 3/04883*  (2022.01)

(56) References Cited

U.S. PATENT DOCUMENTS

| | | |
|---|---|---|
| 2010/0182265 A1 | 7/2010 | Kim et al. |
| 2011/0209089 A1 | 8/2011 | Hinckley et al. |
| 2011/0209103 A1 | 8/2011 | Hinckley et al. |
| 2011/0260997 A1 | 10/2011 | Ozaki |
| 2012/0235938 A1* | 9/2012 | Laubach ............ G06F 3/04883 |
| | | 345/173 |
| 2016/0026358 A1 | 1/2016 | Stewart et al. |
| 2019/0174070 A1* | 6/2019 | Jang ..................... H04N 7/185 |
| 2019/0231069 A1 | 8/2019 | Mehandjiysky et al. |
| 2021/0026527 A1* | 1/2021 | Humbert ............ G06F 3/04883 |

OTHER PUBLICATIONS

Written Opinion of the International Searching Authority mailed on May 17, 2018, issued in connection with International Application No. PCT/US2018/23304 (4 pages).

\* cited by examiner

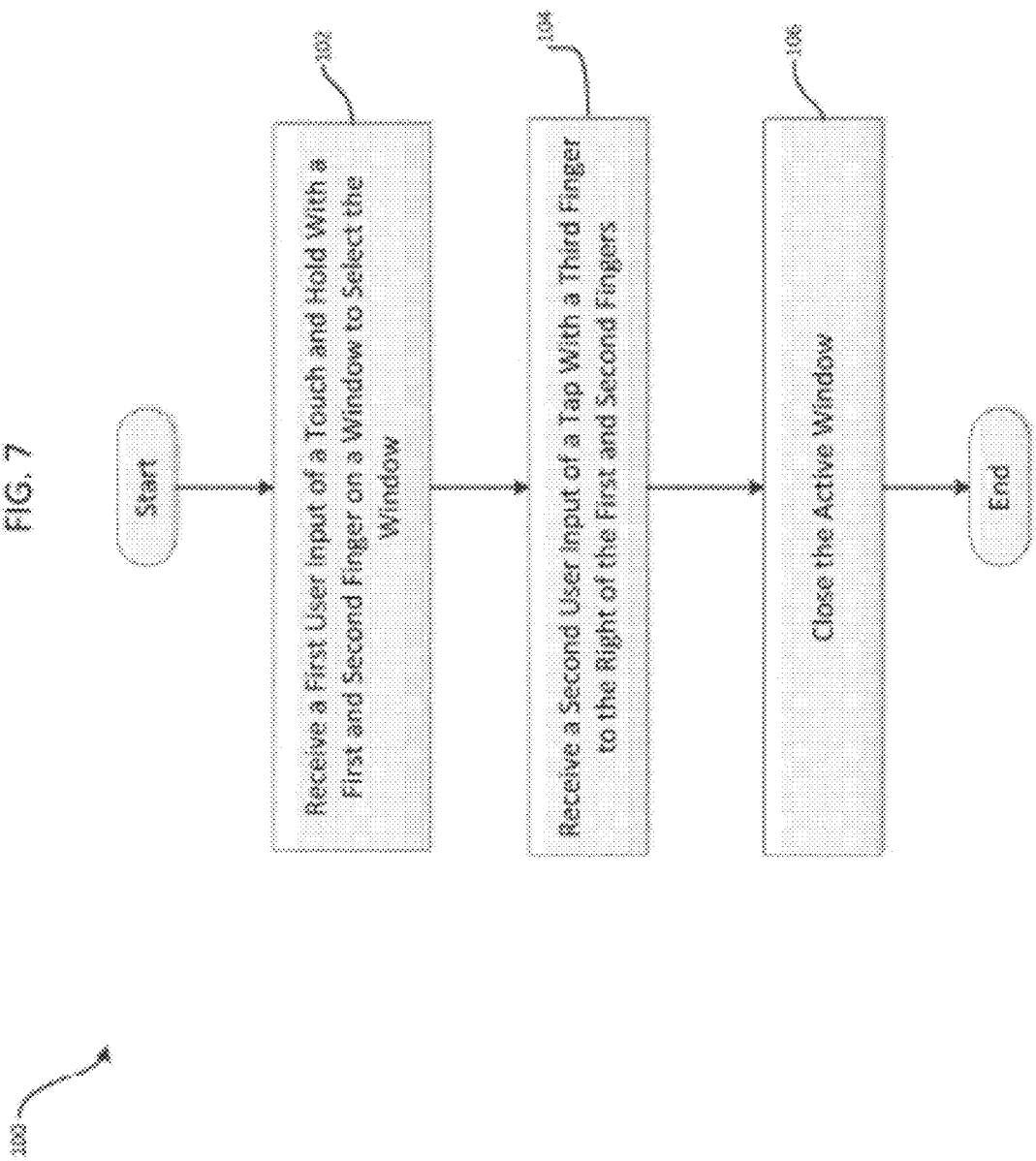

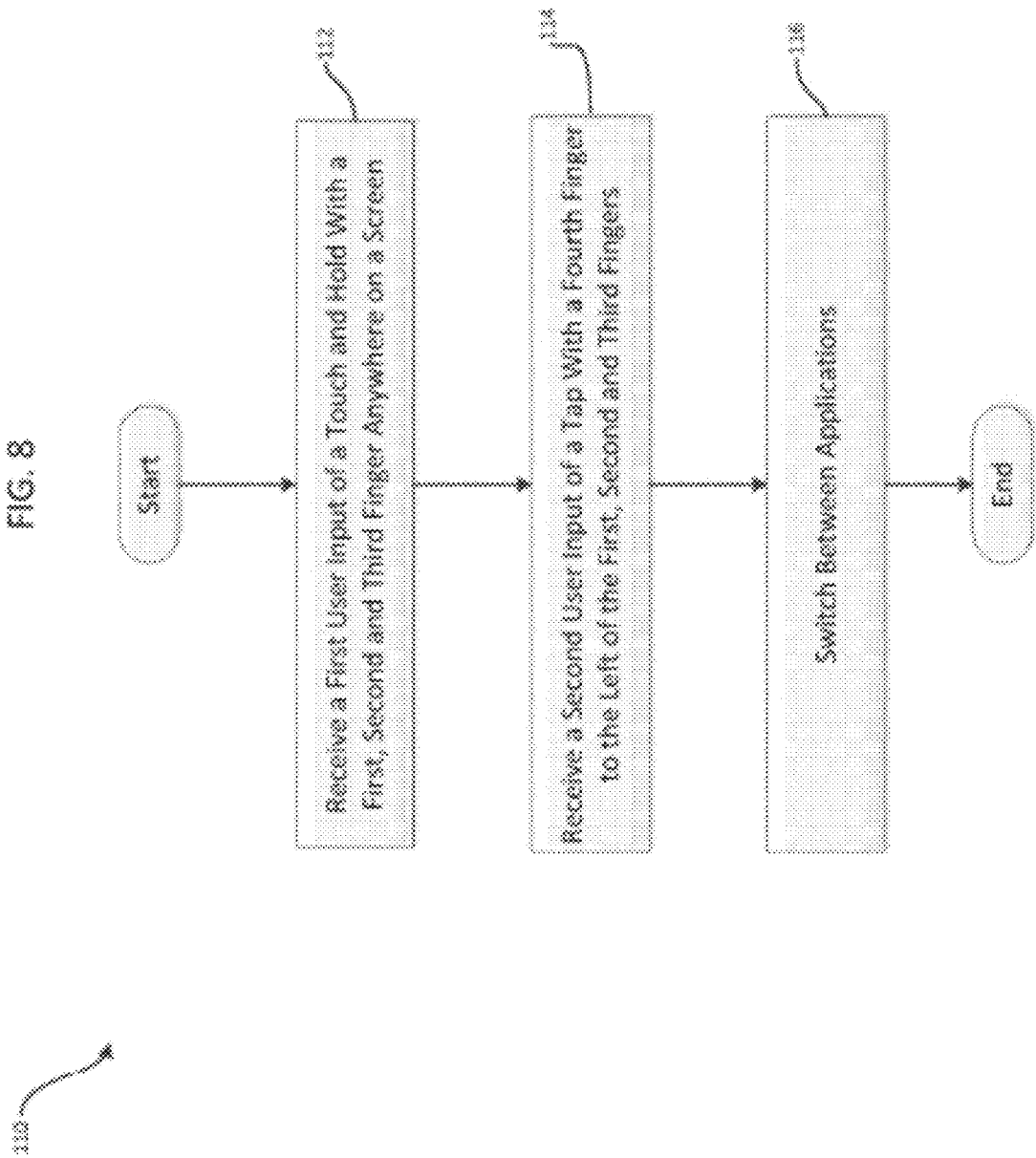

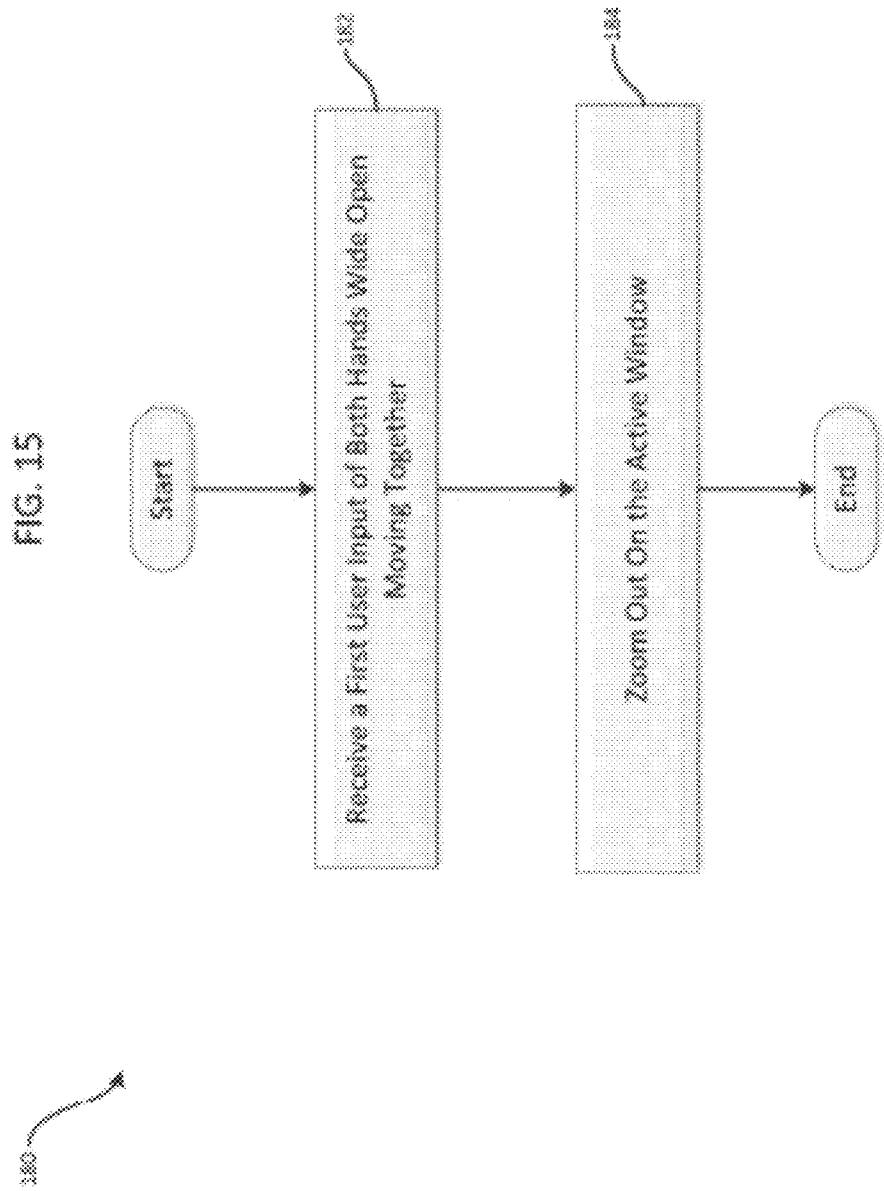

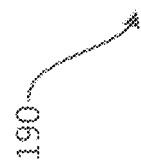
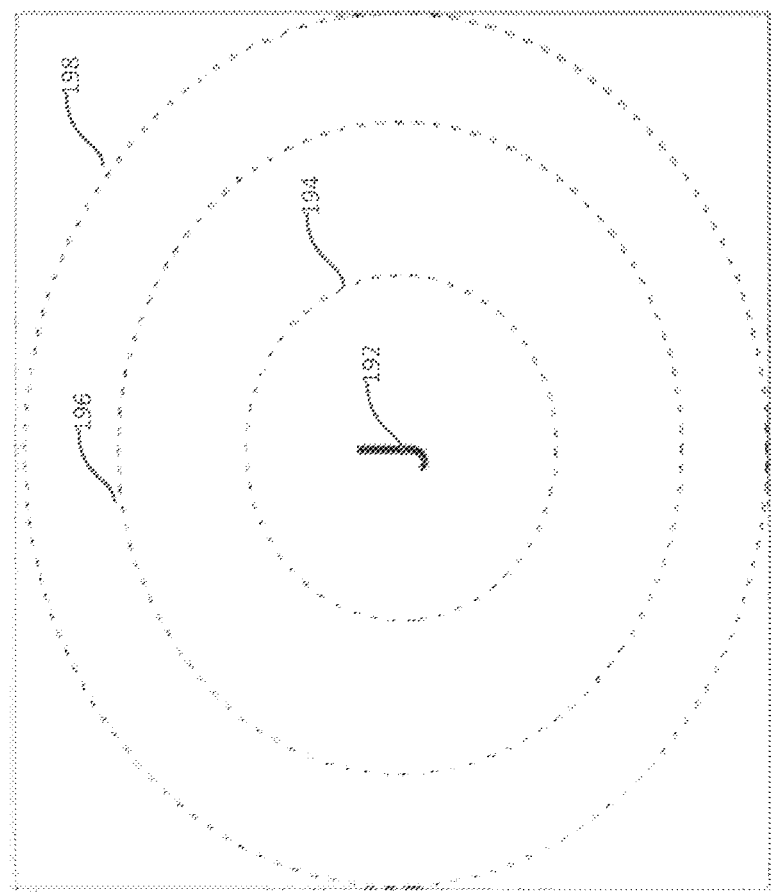

SMART DESK WITH GESTURE DETECTION AND CONTROL FEATURES

CROSS-REFERENCE TO RELATED APPLICATIONS

This application is a continuation of U.S. patent application Ser. No. 15/926,283, filed on Mar. 20, 2018, now U.S. Pat. No. 10,969,956, which is hereby incorporated by reference in its entirety.

FIELD OF THE DISCLOSURE

The present disclosure relates to a smart desk. More particularly, the present disclosure relates to a smart desk with gesture detection and control features.

BACKGROUND OF THE INVENTION

Current solutions for workspaces include a desk and a personal computer. The personal computer is usually a desktop computer which is connected to one or more monitors, a keyboard, a mouse, and speakers. The personal computer can also be an all-in-one device including a single monitor which also houses a memory, processor, motherboard and other standard computer components.

The issue with these workspaces is that they require a user to always interact with a physical keyboard and mouse to perform all user commands and functions with respect to any tasks performed on a computer. For example, if a user of a computer device has to read a long document which requires scrolling or paging through the document, the user must either always have his or her hands on the keyboard or mouse and/or must be constantly adjusting his or her sitting position to reach the keyboard or mouse to scroll or page through the document. As a result, a user is unable to sit back in his or her chair and read a document and perform basic user tasks such as zooming in and out, scrolling up and down, and turning pages.

Another issue with current workspaces is that using touch screens is difficult. Because desks are not designed for touch screen monitors and workstations, a touchscreen is normally placed at a distance far from where a user sits so that it is very inconvenient for the user to interact with the touchscreen. Moreover, these touchscreens only allow basic movement of content items on the computer screen such as placing a cursor or moving and dragging a window. There are no gestures to allow easy manipulation of content items. Further, with respect to gestures, current solutions only exist at the application level and therefore the gestures only work for a certain application. When using another application, the gestures may change or there may be no gestures at all.

Yet another issue with current workspaces is that a physical keyboard is required. This requires extra space and can lead to carpal tunnel syndrome. Virtual keyboards can mitigate these issues but the current solutions for virtual keyboards are not effective in allowing the user to type quickly and normally as a physical keyboard.

What is needed therefore is a smart desk with gesture motion and touch controls that allows a user to perform computer commands to manipulate content items without interacting with a mouse or a keyboard. What is also needed is a smart desk that is immersive and allows a user to manipulate touchscreens easily. What is also needed is a smart desk with a virtual keyboard that allows a user to type as fast as a physical keyboard.

SUMMARY OF THE INVENTION

A smart desk having one or more touch displays is provided. The smart desk can be programmed with one or more touch or touchless gestures for executing computer commands or manipulating content displayed on the one or more touch displays. Touchless gestures can be executed by the smart desk by tracking a user's movements with a motion sensor. The touch gestures can instruct the smart desk to transfer content between the one or more touch displays, expand content on the one or more touch displays, close a tab or a window, minimize a window and/or switch between applications. The touchless gestures can include copy, paste, scroll, screen shot, page turn, and/or zoom in or out.

A number of different touch gestures can be programmed to be recognized by the smart desk and can be assigned to perform any computer function. For example, one gesture can include a touch and hold with a first finger and a tap with a second finger to the right of the first finger. Another gesture can include a touch and hold with a first finger and a tap with a second finger to the left of the first finger. Yet another gesture can be a touch and hold with two fingers and a tap with a third finger to the right of the first and second fingers. Similarly, another gesture can be a touch and hold with two fingers and a tap with a third finger to the left of the first and second fingers. Yet another gesture can be a touch and hold with three fingers and a tap with a fourth finger to the right of the three fingers. Similarly, another gesture can be a touch and hold with three fingers and a tap with a fourth finger to the left of the three fingers. These gestures can be assigned (by a user or programmer) to perform any of the touch and touchless gestures described above and below.

As noted above, the smart desk can include a motion sensor for tracking a user's movement to detect touchless gestures to perform computer commands. A grab gesture can be indicative of a user's desire to copy selected content and a release or throw gesture can be indicative of the user's desire to paste the copied content. A gesture where a user holds and snaps an imagery camera can be indicative of the user's desire to take a screen shot of the content being displayed on the smart desk. A gesture where a user moves one or more fingers up and down can be indicative of the user's desire to scroll displayed content. A gesture where a user moves his or her hand backwards and forwards can be indicative of the user's desire to turn pages forward or backward on a document being displayed on the smart desk. A gesture where a user moves his or her hands apart can be indicative of the user's desire to zoom in and a gesture where the user moves his or her hands together can be indicative of the user's desire to zoom out.

A smart desk having a first touch display and a second touch display is provided. The smart desk includes a processor and a memory having computer code stored thereon which, when executed, causes the processor to perform the following functions. First, the smart desk can detect a gesture at the first touch display. The smart desk can determine whether the gesture is indicative of a user's desire to transfer content displayed on the first touch display to the second touch display. The smart desk can cause the content to be transferred from the first touch display to the second touch display if the gesture is indicative of the user's desire to transfer the content. The gesture can include a first touch user input for selecting the content and a second touch user input for transferring the selected content from the first touch display to the second touch display.

A method is also provided. The method includes detecting a gesture at a first touch display. The gesture includes a first touch user input for selecting content displayed on the first touch display and a second touch user input for indicating a desire to transfer the selected content from the first touch display to a second touch display. The method includes determining whether the gesture is indicative of a user's desire to transfer content displayed on the first touch display to the second touch display. The method includes transferring the content from the first touch display to the second touch display if the gesture is indicative of the user's desire to transfer the content.

BRIEF DESCRIPTION OF THE DRAWINGS

The foregoing features of the disclosure will be apparent from the following Detailed Description, taken in connection with the accompanying drawings, in which:

FIG. 7 is a flowchart illustrating processing steps for closing an active window;

FIG. 8 is a flowchart illustrating processing steps for switching between applications;

FIG. 14 is a flowchart illustrating processing steps for zooming in;

FIG. 15 is a flowchart illustrating processing steps for zooming out;

FIG. 16 is a drawing illustrating a haptic response system for keys of a virtual keyboard of the smart desk.

DETAILED DESCRIPTION

The present disclosure relates to a smart desk with gesture detection and control features, as discussed in detail below in connection with FIGS. 1-17.

Figure 1:
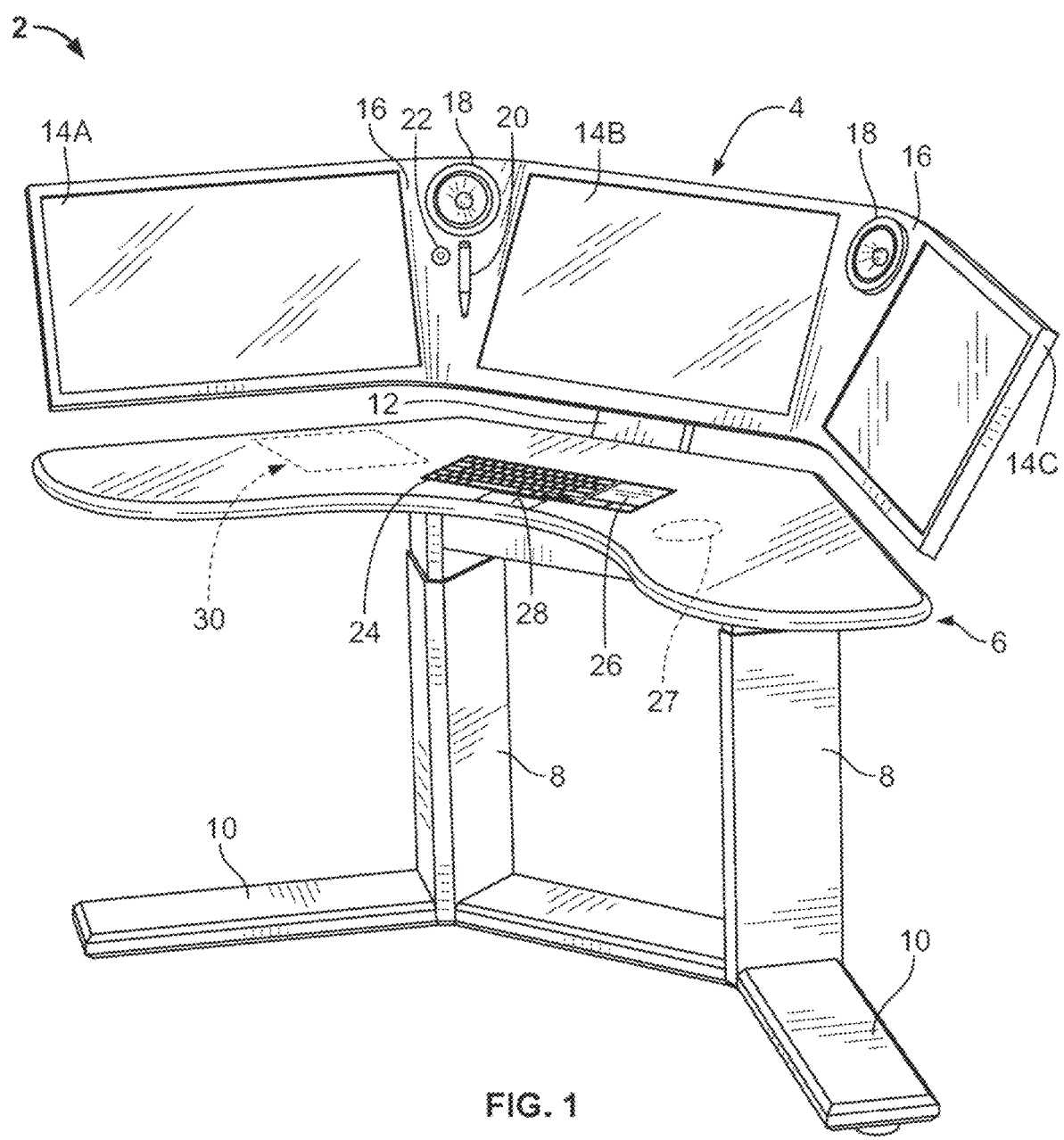
FIG. 1 is a perspective view of an example of a smart desk of the present disclosure.

FIG. 1 is a perspective view of an example of a smart desk 2 of the present disclosure. The smart desk 2 includes a display housing 4, a surface housing 6, one or more support members 8, and one or more legs 10. The display housing 4 can be attached to the surface housing 6 by a display support member 12. The one or more support members 8 can be attached to the surface housing 6 and the one or more legs 10. The one or more support members 8 and the one or more legs 10 bear the weight of the smart desk 2. The one or more legs 10 can be elongated in length and can be positioned along substantially the same angle as the surface housing 6 to provide a greater degree of balance and support to the smart desk 2. The one or more legs 10 can be positioned at an angle to allow a greater amount of space for a user of the smart desk to move his or feet or chair so as to not interfere with the one or more legs 10. The smart desk 2 can include a personal computer or computer components needed for the personal computer. These components are housed neatly within the smart desk 2. The computer components such as the processor, memory, storage, motherboard, etc. can be housed in the display housing 4 or the surface housing 6 to provide an integrated clean look and feel for the user of the smart desk. However, the smart desk 2 is not limited to any specific location for these computer components which can be housed externally to the smart desk 2. Accordingly, the smart desk 2 is a single integrated device that functions as a desk and a personal computer.

The display housing 4 can include a first touch display 14A, a second touch display 14B, and a third touch display 14C. As shown in FIG. 1, the first touch display 14A can be positioned to the left of the second touch display 14B and the third touch display 14C can be positioned to the right of the second touch display 14B. The second touch display 14B can be positioned so that the head and neck of a user of the smart desk 2 is facing directly forward and the eyes of the user can look directly forward to view the second touch display 14B. The first touch display 14A and the third touch display 14C can be positioned at an angle relative to the second touch display 14B so that the user of the smart desk 2 is immersed in the smart desk 2. The angle can be the same angle as the back edge of the surface housing to save space and provide a better appearance for the smart desk 2. The first touch display 14A, the second touch display 14B and the third touch display 14C can be configured as touch screens so that a user can manipulate content on the screens by using his or her finger or a smart stylus or similar device. The smart desk 2 is not limited to any particular arrangement of the touch displays as the first touch display 14A, the second touch display 14B, and the third touch display 14C can be positioned in any arrangement. The smart desk 2 is not limited to any specific number of touch displays and can include two or more touch displays. The smart desk 2 can also be designed as one touch display where software of the smart desk can recognize one or more portions of the touch display as sections where each section can function as a separate "touch display" as described in greater detail below.

The display housing 4 can also include a plurality of wedges 16. The plurality of wedges 16 can be positioned between the second touch display 14B and the first touch display 14A, and the second touch display 14B and the third touch display 14C. The plurality of wedges 16 allows the first touch display 14A and the third touch display 14C to be positioned at the proper angle relative to the second touch display 14B to provide a immersive experience for the user of the smart desk 2. The plurality of wedges 16 also allows the first touch display 14A and the third touch display 14C to be positioned at the proper tilt to provide comfortable viewing angle for the user of the smart desk.

The plurality of wedges 16 can also house other peripherals of the smart desk 2. For example, the plurality of wedges can house a plurality of speakers 18 for outputting sound produced by the smart desk 2. The plurality of wedges can also house a smart stylus 20 for manipulating content on the touch displays of the smart desk 2. The smart stylus 20 can also be used to perform the gestures of the smart desk 2 with the smart stylus 20 functioning as a finger of a user as will be described in greater detail below. The plurality of wedges 16 can also house a scanner sensor 22 for scanning documents placed on the surface housing 6, as will be explained in greater detail below. Additionally, other peripherals can be included such as a chargeable headphone, a microphone, and/or a web camera.

The surface housing 6 can include a virtual keyboard 24. The user of the smart desk 2 can use the virtual keyboard 24 in the same way as a normal physical keyboard connected to a personal computer. The virtual keyboard 24 can have the same keys as a standard keyboard. Alternatively, the smart desk 2 can include a physical keyboard which can be connected to the smart desk 2 via Bluetooth or other wireless means. The physical keyboard can also be connected via a wired USB connection if desired. A mouse can also be used with the smart desk 2, but as will be explained in greater detail below, the smart desk 2 includes a number of gestures to manipulate content which can obviate the need for a mouse. Moreover, the smart desk 2 includes touch displays which also obviate the need for a mouse. However, if a mouse is desired, it can be connected to the smart desk 2. Alternatively, the smart desk 2 can include a digital mouse trackpad 26 built into the surface housing 6. The surface housing 6 can also include a mouse trackpad 26 built into and integrated with the surface housing 6. The surface housing 6 can also include a wireless charger 27 for charging a smartphone, smart watch, or any other device capable of being charged by inductive charging means. The wireless charger 27 can conform to the Qi standard or any other wireless charging standards. The charge level of the devices being charged by the wireless charger 27 can be displayed on the touch displays of the smart desk 2. The wireless charger 27 can be built into the surface housing 6 so that a flat integrated surface is presented to a user. The smart desk 2 can synch with a user's smart phone via Bluetooth to provide integrated access calling features such as a display on a touchscreen of the smart desk 2 to show a caller's identification.

A user of the smart desk 2 can use their finger or the smart stylus 20 for writing on any of the touch displays of the smart desk 2. The second touch display 14B can be lowered and/or removed from the display housing 4 so that a user can write on it like a notepad on the surface housing 6.

The surface housing 6 can also include a motion sensor 28 for detecting movement of a user of the smart desk 28. The motion sensor 28 can be any sensor known in the art for detecting movement of the user of the smart desk 2 such as a Leap Sensor. The motion sensor 28 can be placed at the edge of the surface housing 6 between the virtual keyboard 24 and the user of the smart desk 2 so that the motion sensor 28 is proximal to the user. The smart desk 2 is not limited to any specific location of the motion sensor 28 which can be placed in any desired location on the smart desk 2 to adequately detect motion of the user of the smart desk 2. The motion sensor 28 can even be placed on another location outside of the smart desk 2. The smart desk 2 also includes a scan area 30 which is a portion of the surface housing 6.

The scan area 30 allows a user to place a document to be scanned by the scanner sensor 22. The smart desk 2 can provide software for allowing the user to initiate the scan process and to present the user with the document on one of the touchscreens of the smart desk 2. The smart desk 2 can also automatically apply optical character recognition to the document so that the user can search the document once it is scanned.

FIGS. 2-8 will now be discussed in greater detail. Each of these figures describes processing steps for executing a touch "gesture" which can perform some computer related task. In particular, a user of the smart desk 2 performs an action on a touchscreen with the intent of performing a computer operation (e.g., moving a content item to another touchscreen). As will be discussed below in connection with FIGS. 2-8, each gesture results in the smart desk 2 executing a particular computer operation. However, each gesture is not limited or tied to any specific computer operation. For example, a user of the smart desk 2 can assign and re-assign a gesture to perform any computer operation described herein or other computer operations entirely. Accordingly, the smart desk 2 is modular in that performing a gesture can be assigned to any computer task.

Figure 2:
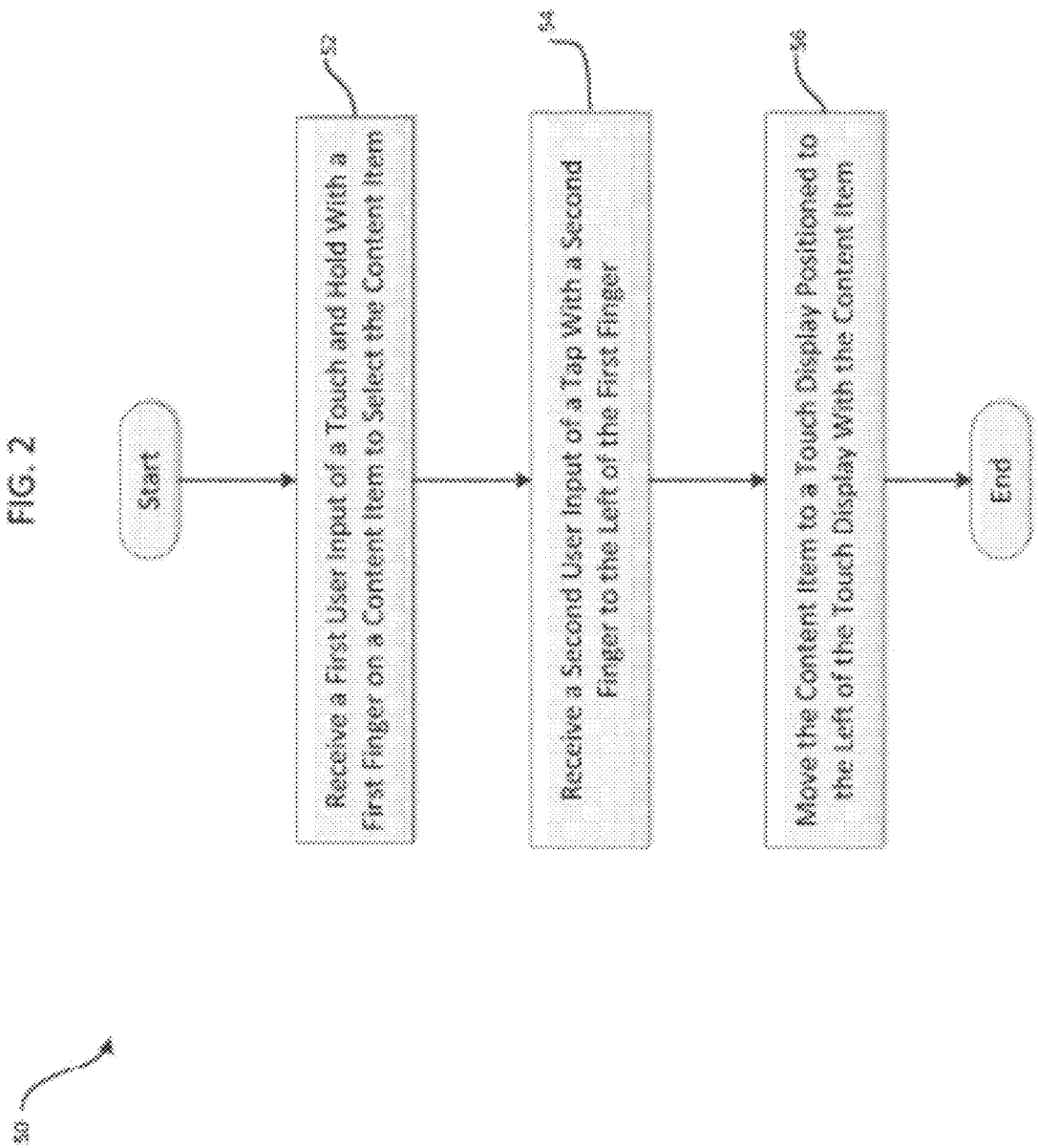
FIG. 2 is a flowchart illustrating processing steps for moving content from a first touch display to a second touch display when the second touch display is positioned to the left of the first touch display.

FIG. 2 is a flowchart illustrating processing steps 50 for executing a gesture for moving a content item from a first touch display displaying the content item to a second touch display positioned to the left of the first touch display. In step 52, the smart desk 2 receives a first user input of a touch and hold with a first finger on a content item to select the content item. In step 54, the smart desk 2 receives a second user input of a tap with a second finger to the left of the first finger. Execution of these steps can be indicative of a user desire to transfer the content item to a touch display positioned to the left of the touch displaying currently displaying the content item. Accordingly, in step 56, once this gesture is executed, the smart desk 2 can move the content item to a touch display positioned to the left of the touch display currently displaying the content item. By way of example, if a content item is currently being displayed on the second touch display 14B, the user can execute the above gesture to transfer the content item to the first touch display 14A. Although the process steps 50 requires the first and second user inputs to be executed with a first and a second finger, a plurality of fingers can be used for either of these inputs. Moreover, the first input does not need to be a touch and hold and can include some other touch input such as a tap. Similarly, the second input does not have to be a tap and can be any other touch input such as a touch and hold. The above gesture can also be executed in other finger combinations as discussed herein with respect to performing other tasks. This gesture can also be re-assigned by the user of the smart desk 2 to perform any of the computer tasks discussed herein.

Figure 3:
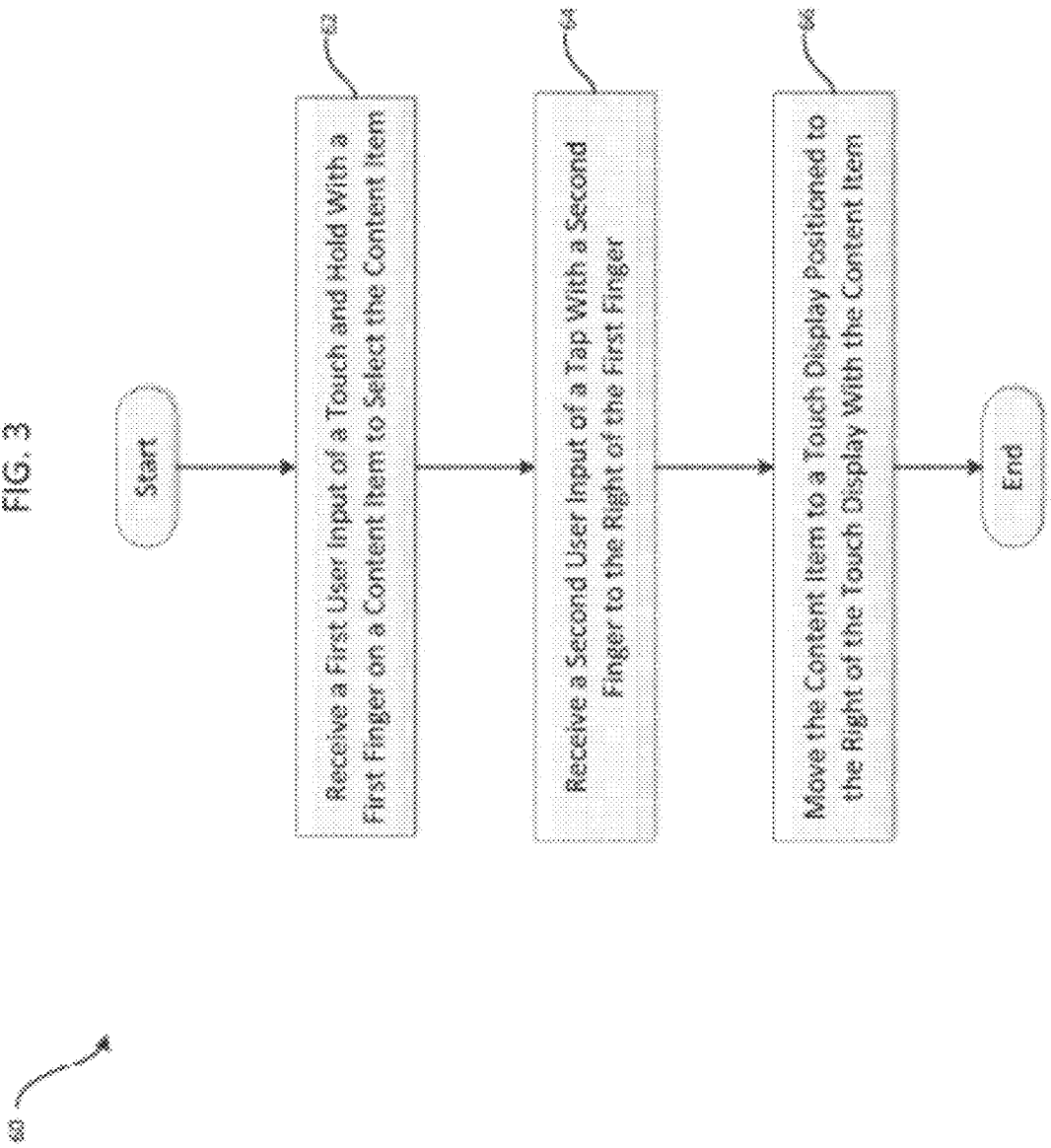
FIG. 3 is a flowchart illustrating processing steps for moving content from the first touch display to the second touch display when the second touch display is positioned to the right of the first touch display.

FIG. 3 is a flowchart illustrating processing steps 60 for executing a gesture for moving a content item from a first touch display displaying the content item to a second touch display positioned to the right of the first touch display. In step 62, the smart desk 2 receives a first user input of a touch and hold with a first finger on a content item to select the content item. In step 64, the smart desk 2 receives a second user input of a tap with a second finger to the right of the first finger. Execution of these steps can be indicative of a user desire to transfer the content item to a touch display positioned to the right of the touch display currently displaying the content item. Accordingly, in step 66, once this gesture is executed, the smart desk 2 can move the content item to a touch display positioned to the right of the touch display currently displaying the content item. By way of example, if a content item is currently being displayed on the second touch display 14B, the user can execute the above gesture to transfer the content item to the third touch display 14C. Although the process steps 60 requires the first and second user inputs to be performed with a first and a second finger, a plurality of fingers can be used for either of these inputs. Moreover, the first input does not need to be a touch and hold and can include some other touch input such as a tap. Similarly, the second input does not have to be a tap and can be any other touch input such as a touch and hold. The above gesture can computer tasks discussed herein.

Figure 4:
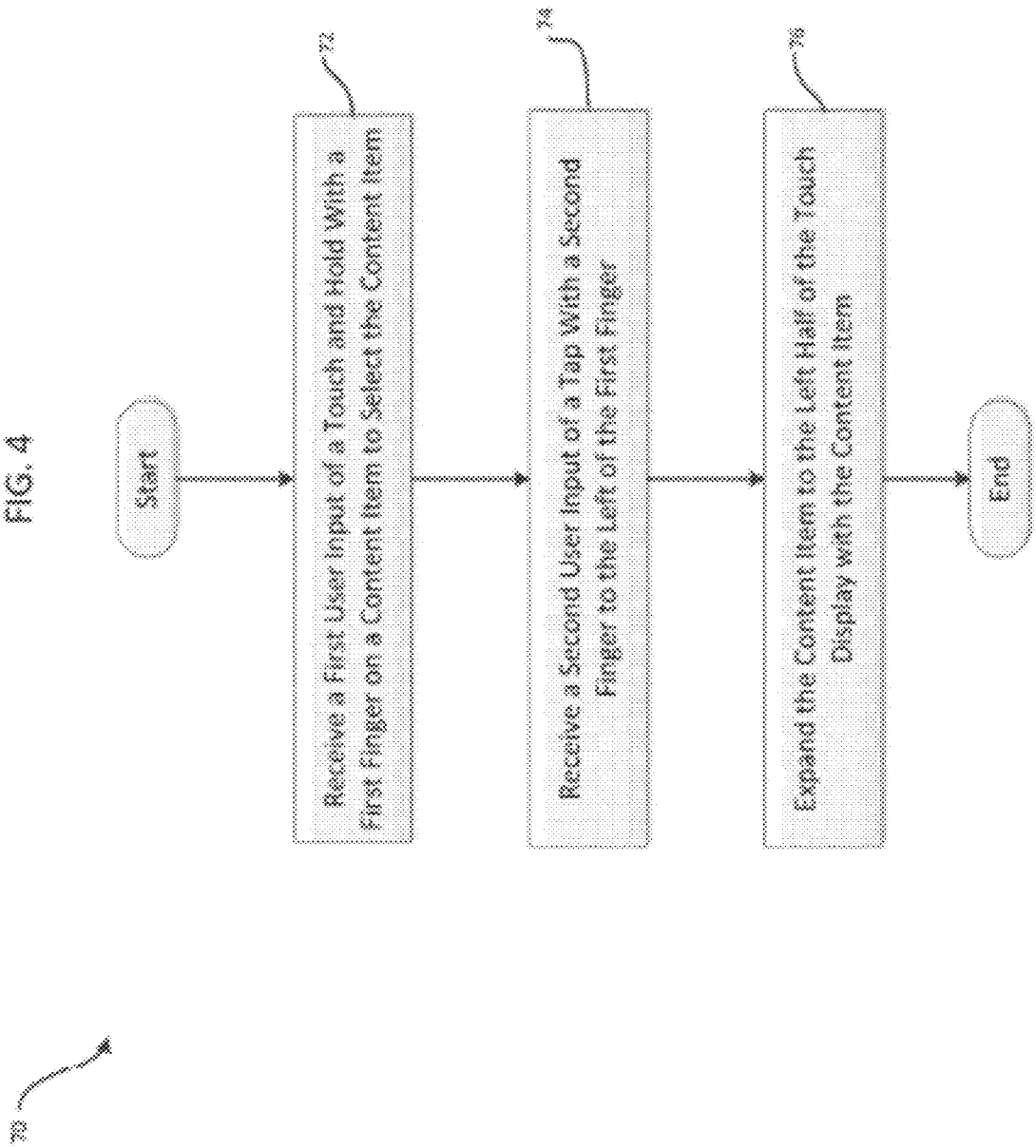
FIG. 4 is a flowchart illustrating processing steps for expanding content to the left half of a touch display currently displaying the content.

FIG. 4 is a flowchart illustrating processing steps 70 for executing a gesture for expanding a content item on the left half of a touch display currently displaying the content item. In step 72, the smart desk 2 receives a first user input of a touch and hold with a first finger on a content item to select the content item. In step 74, the smart desk 2 receives a second user input of a tap with a second finger to the left of the first finger. Execution of these steps can be indicative of a user desire to expand the content item to the left half of the touch display currently displaying the content item. Accordingly, in step 76, once this gesture is executed, the smart desk 2 can expand the content item to the left half of the touch display so that content item is maximized and sized automatically to fill the left half of the touch display. Although the process steps 70 requires the first and second user inputs to be done a first and a second finger, a plurality of fingers can be used for either of these inputs. Moreover, the first input does not need to be performed with a touch and hold input and can include some other touch input such as a tap. Similarly, the second input does not have to be a tap and can be any other touch input such as a touch and hold. The above gesture can also be executed in other finger combinations as discussed herein with respect to performing other tasks. This gesture can also be re-assigned by the user of the smart desk 2 to perform any of the computer tasks discussed herein.

Figure 5:
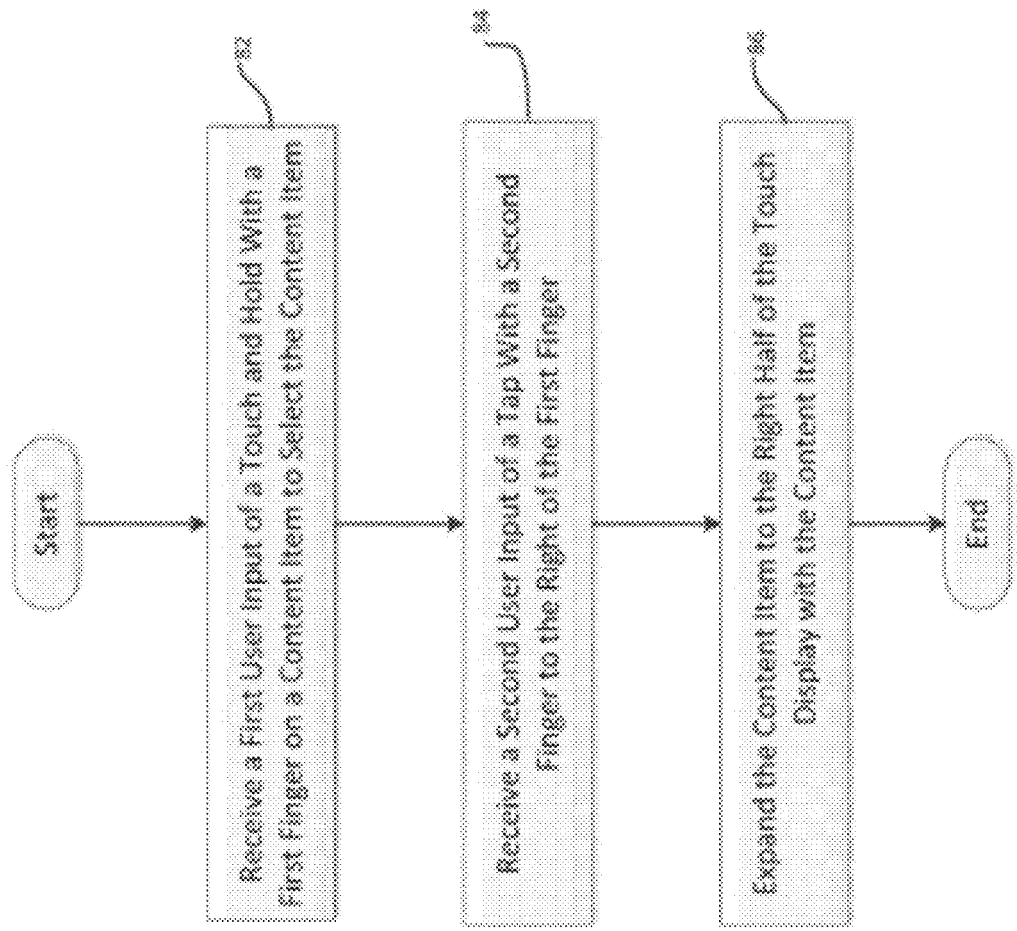
FIG. 5 is a flowchart illustrating processing steps for expanding content to the right half of a touch display currently displaying the content.

FIG. 5 is a flowchart illustrating processing steps 80 for executing a gesture for expanding a content item on the right half of a touch display currently displaying the content item. In step 82, the smart desk 2 receives a first user input of a touch and hold with a first finger on a content item to select the content item. In step 84, the smart desk 2 receives a second user input of a tap with a second finger to the right of the first finger. Execution of these steps can be indicative of a user desire to expand the content item to the right half of the touch display currently displaying the content item. Accordingly, in step 86, once this gesture is executed, the smart desk 2 can expand the content item to the right half of the touch display so that content item is maximized and sized automatically to fill the right half of the touch display. Although the process steps 80 requires the first and second user inputs to be performed with a first and a second finger, a plurality of fingers can be used for either of these inputs. Moreover, the first input does not need to be a touch and hold input and can include some other touch input such as a tap. Similarly, the second input does not have to be a tap and can be any other touch input such as a touch and hold. The above gesture can also be executed in other finger combinations as discussed herein with respect to performing other tasks. This gesture can also be re-assigned by the user of the smart desk 2 to perform any of the computer tasks discussed herein.

As can be seen in FIGS. 2-5, the gesture to transfer a content item from one touch display to another touch display is the same as the gesture to expand a window to either a right half or left half of a screen. If it is desired for the smart desk 2 to have both of these gestures, then the smart desk 2 can have an additional requirement for differentiating between the gestures. One example difference can be the distance between the fingers of a user when selecting content in the first user input and executing the gesture in the second user input. For example, a gesture to transfer content items between touch displays can be executed if the second user input of a tap of a second finger occurs at a first predetermined distance from the first input of a touch and hold. This predetermined distance can be 2 inches by way of example. The gesture to expand a window to the right or left of the current touch display can then be executed if the second user input of a tap of a second finger occurs at a second predetermined distance from the first input of a touch and hold. This predetermined distance can be 1 inch by way of example. The above distances can be ranges of a distance. For example the first predetermined distance can be between 1.5 and 2.5 inches and the second predetermined distance can be 0.5 and 1.5 inches.

Figure 6A:
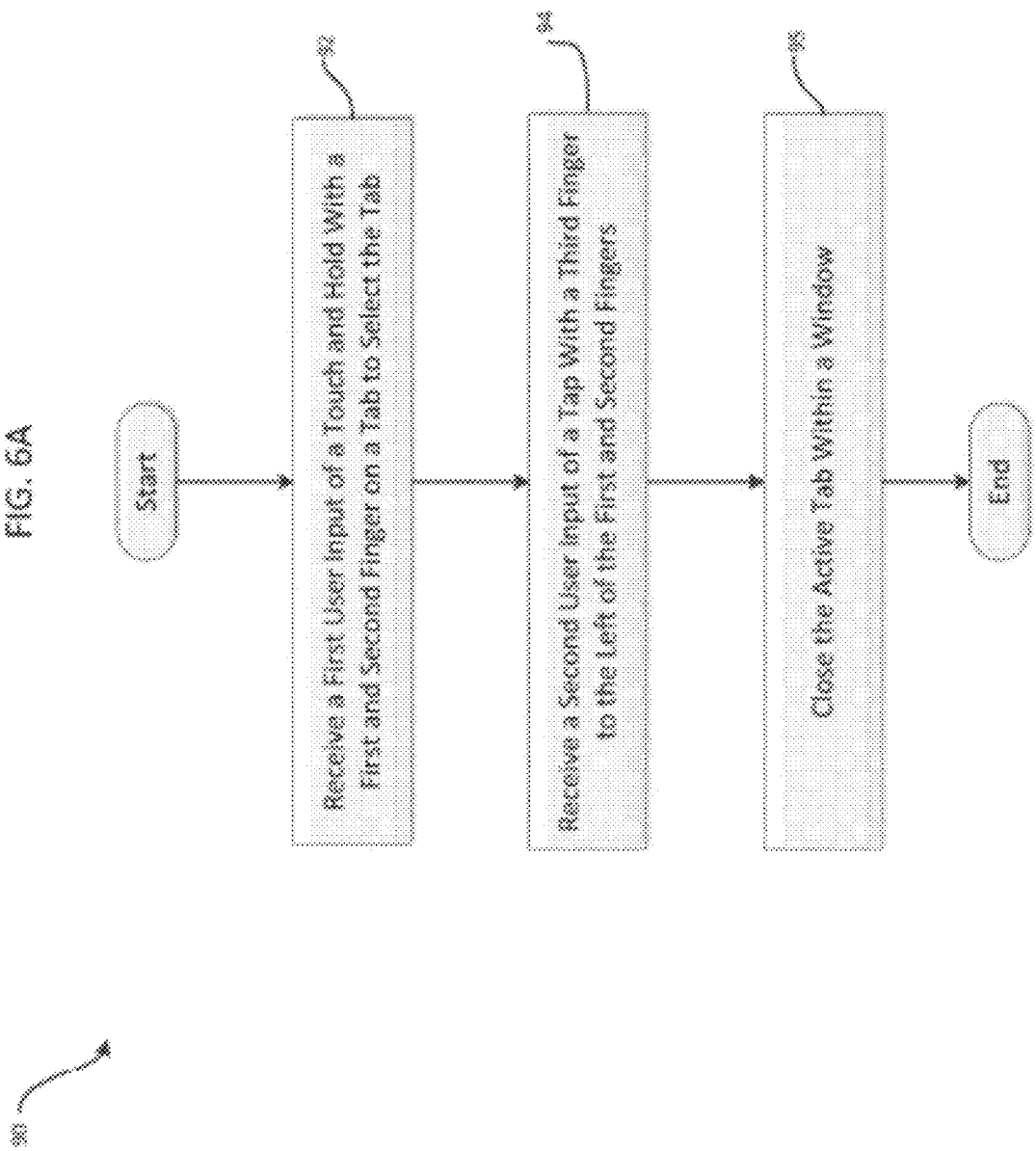
FIG. 6A is a flowchart illustrating processing steps for closing an active tab within a window.

FIG. 6A is a flowchart illustrating processing steps 90 for executing a gesture for closing an active tab within a window. For example, a web browser can have multiple tabs where different websites are opened, and this gesture, for example, can close the current tab within a web browser. In step 92, the smart desk 2 receives a first user input of a touch and hold with a first and second finger on a content item to select the content item (e.g., a tab within an active window). In step 94, the smart desk 2 receives a second user input of a tap with a third finger to the left of the first and second finger. Execution of these steps can be indicative of a user desire to close a current tab within a window. Accordingly, in step 95, once this gesture is executed, the smart desk 2 can close the current tab within an active window. This gesture obviates the need for a user to use a mouse and click a small "x" that is usually located on a tab of a browser or some other window. Although the process steps 90 requires the first user input to use two fingers and the second user input to use one finger, any number of fingers can be used to execute this gesture. Moreover, the first user input does not need to be a touch and hold and can include some other touch input such as a tap. Similarly, the second user input does not have to be a tap and can be any other touch input such as a touch and hold. The above gesture can also be executed in other finger combinations as discussed herein with respect to performing other tasks. This gesture can also be re-assigned by the user of the smart desk 2 to perform any of the computer tasks discussed herein.

Figure 6B:
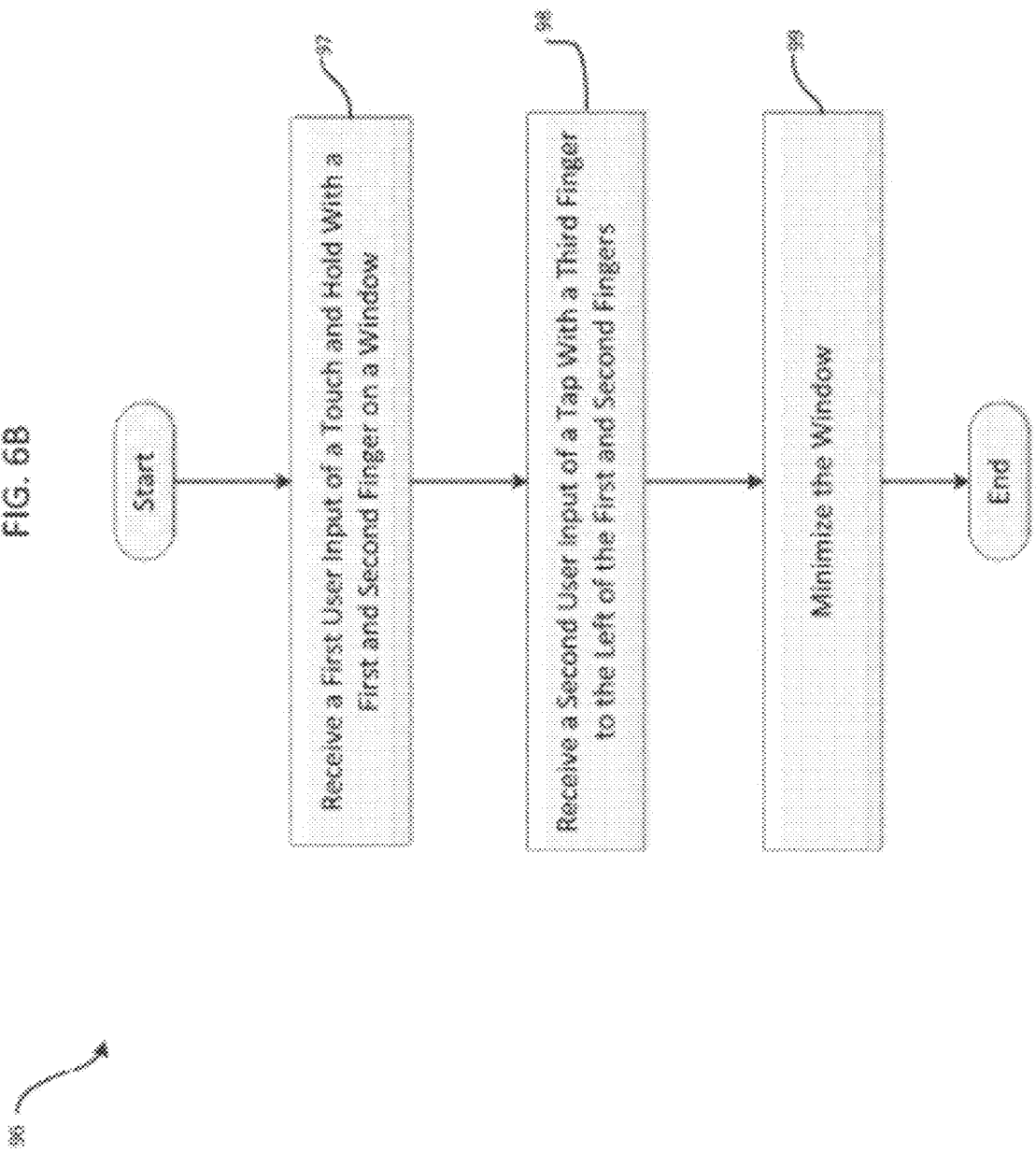
FIG. 6B is a flowchart illustrating processing steps for minimizing a window.

Optionally, the gesture described in FIG. 6A can be assigned to minimize a window. Accordingly, FIG. 6B is a flowchart illustrating processing steps 96 for executing a gesture for minimizing a window. This alternate gesture can obviate the need for a user to click on the small minimize icon on the top right of most windows. In step 97, the smart desk 2 receives a first user input of a touch and hold with a first and second finger on a window to select the window to be minimized. In step 98, the smart desk 2 receives a second user input of a tap with a third finger to the left of the first and second finger. Execution of these steps can be indicative of a user desire to minimize the window. Accordingly, in step 99, once this gesture is executed, the smart desk 2 can minimize the window. Although the process steps 96 requires the first user input to use two fingers and the second user input to use one finger, any number of fingers can be used to execute this gesture. Moreover, the first user input does not need to be a touch and hold and can include some other touch input such as a tap. Similarly, the second user input does not have to be a tap and can be any other touch input such as a touch and hold. The above gesture can also be executed in other finger combinations as discussed herein with respect to performing other tasks. This gesture can also be re-assigned by the user of the smart desk 2 to perform any of the computer tasks discussed herein.

FIG. 7 is a flowchart illustrating processing steps 100 for executing a gesture for closing an active window. In step 102, the smart desk 2 receives a first user input of a touch and hold with a first and second finger on a content item to select the content item (e.g., an active window). In step 104, the smart desk 2 receives a second user input of a tap with a third finger to the right of the first and second finger. Execution of these steps can be indicative of a user desire to close an active window. Accordingly, in step 106, once this gesture is executed, the smart desk 2 can close the current window. This gesture obviates the need for a user to use a mouse and click a small "x" that is usually located on a window. Although the process steps 100 requires the first user input to use two fingers and the second user input to use one finger, any number of fingers can be used to execute this gesture. Moreover, the first user input does not need to be a touch and hold and can include some other touch input such as a tap. Similarly, the second user input does not have to be a tap and can be any other touch input such as a touch and hold. The above gesture can also be executed in other finger combinations as discussed herein with respect to performing other tasks. This gesture can also be re-assigned by the user of the smart desk 2 to perform any of the computer tasks discussed herein.

FIG. 8 is a flowchart illustrating processing steps 110 for executing a gesture for switching between applications running on an operating system of the smart desk 2. In step 112, the smart desk 2 receives a first user input of a touch and hold with a first, second finger, and third finger anywhere on the screen. In step 114, the smart desk 2 receives a second user input of a tap with a fourth finger to the left of the first, second and third fingers. Execution of these steps can be indicative of a user desire to switch between applications. Accordingly, in step 116, once this gesture is executed, the smart desk 2 can switch between applications. Although the process steps 110 requires the first user input to use three fingers and the second user input to use one finger, any number of fingers can be used to execute this gesture. Moreover, the first user input does not need to be a touch and hold and can include some other touch input such as a tap. Similarly, the second user input does not have to be a tap and can be any other touch input such as a touch and hold. The above gesture can also be executed in other finger combinations as discussed herein with respect to performing other tasks. This gesture can also be re-assigned by the user of the smart desk 2 to perform any of the computer tasks discussed herein.

As noted above, the gestures described above in connection with FIGS. 2-8 are not limited to the computer operation performed at the end of the process steps in FIGS. 2-8. Each gesture can correspond to any computer task described herein or any other computer task that can be performed. For example, with respect to the gesture described in FIGS. 2-3 where a user touches and holds with a first finger and taps to the left/right with a second finger (at a first predetermined distance away from the first finger), this action can be assigned to perform any other task described herein such as expanding an active window, minimizing a window, closing a tab or a window, switching between applications, or some other computer task. Moreover, with respect to the gesture described in FIGS. 4-5 where a user touches and holds with a first finger and taps to the left/right with a second finger (at a second predetermined distance away from the first finger), this action can be assigned to perform any other task described herein such moving content between touchscreens, minimizing a window, closing a tab or a window, switching between applications, or some other computer task. Further, with respect to the gesture described in FIG. 6A where a user touches and holds a first and second finger on an active tab within a window (to close the tab) and then taps with a third finger to the left of the first and second finger, this action can be assigned to perform any other task described herein such minimizing a window, moving content between touchscreens, expanding an active window left or right, closing an active window, switching between applications, or some other computer task. Moreover, with respect to the gesture described in FIG. 6B where a user touches and holds a first and second finger on a window and then taps with a third finger to the left of the first and second finger to minimize the selected window, this action can be assigned to perform any other task described herein such closing an active tab, moving content between touchscreens, expanding an active window left or right, closing an active window, switching between applications, or some other computer task. Still further, with respect to the gesture described in FIG. 7 where a user touches and holds a first and second finger on an active window (to closed the window) and then taps with a third finger to the right of the first and second finger, this action can be assigned to perform any other task described herein such moving content between touchscreens, expanding an active window left or right, closing a tab within an active window, switching between applications, or some other computer task. Additionally, with respect to the gesture described in FIG. 8 where a user touches and holds a first, second and third finger on the screen (to switch between applications) and then taps with a third finger to the left of the first, second and third fingers, this action can be assigned to perform any other task described herein such moving content between touchscreens, expanding an active window left or right, closing an active window, closing a tab within an active window, or some other computer task.

FIGS. 9-15 will now be described in greater detail. These figures illustrate processing steps for touchless gestures to execute computer commands. These touchless gestures do not require a user to interact with a touchscreen on the smart desk 2. Rather, a user of the smart desk 2 can make gestures while sitting back in his or her chair and the smart desk 2 can always track the user with the motion sensor 28. Upon a positive determination that a user is performing a gesture to execute a computer command, the smart desk 2 can execute the command as will be described in greater detail below.

Figure 9:
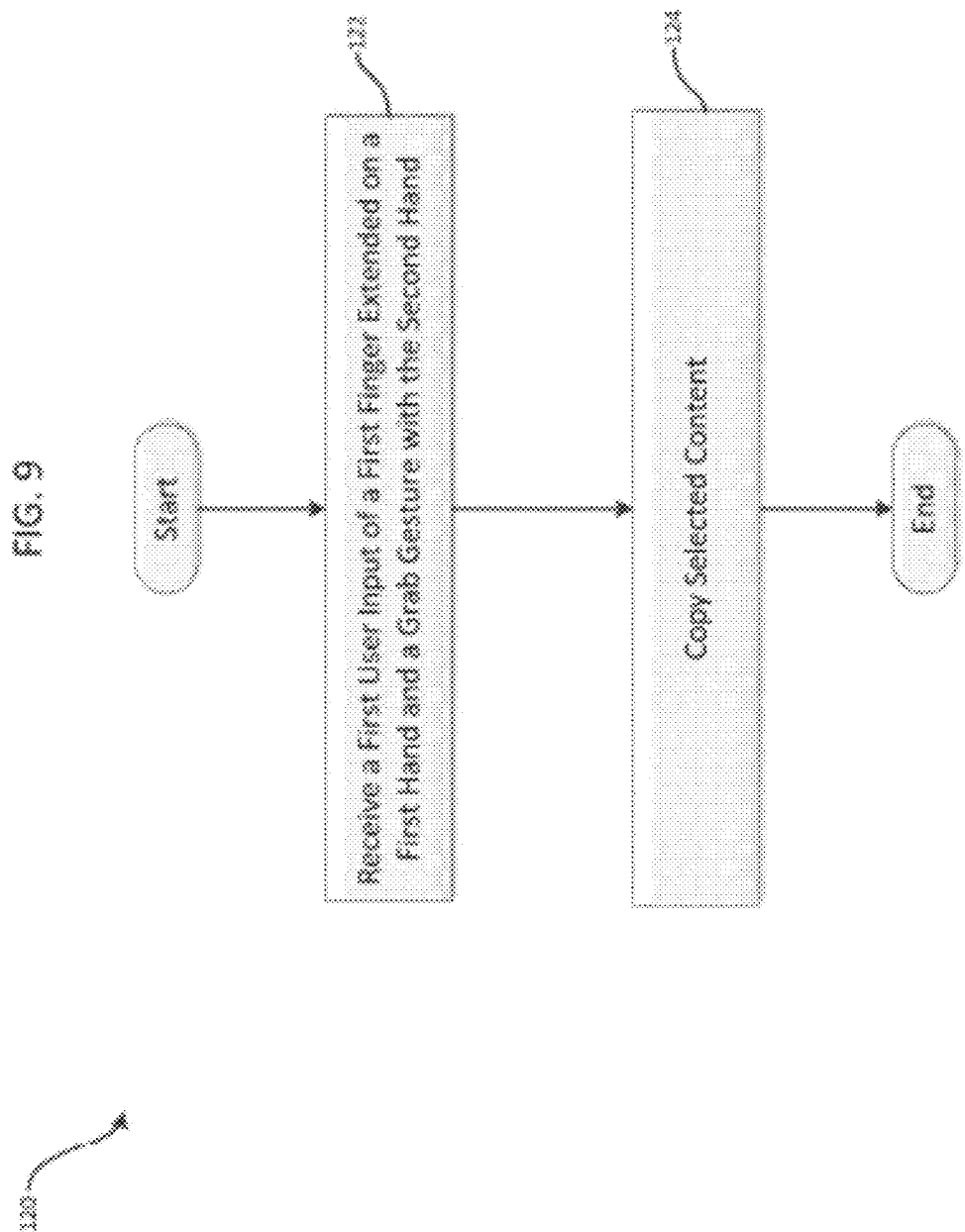
FIG. 9 is a flowchart illustrating processing steps for copying selected content.

FIG. 9 is a flowchart illustrating processing steps 120 for executing a gesture to copy selected content. In step 122, the smart desk 2 can receive a first user input of a first finger extended on a first hand and a grab gesture with a second hand. Alternatively, a user of the smart desk 2 can make a grab gesture with a first hand without requiring a finger to be extended. The grab gesture can be executed with all five fingers of a hand where the fingers are initially extended and then form a closed first as if the user is actually grabbing the selected content. The smart desk 2 can make a "crunch" or a sound of a paper crumpling up or some other sound to provide feedback to the user that the smart desk 2 successfully copied the selected content.

Figure 10:
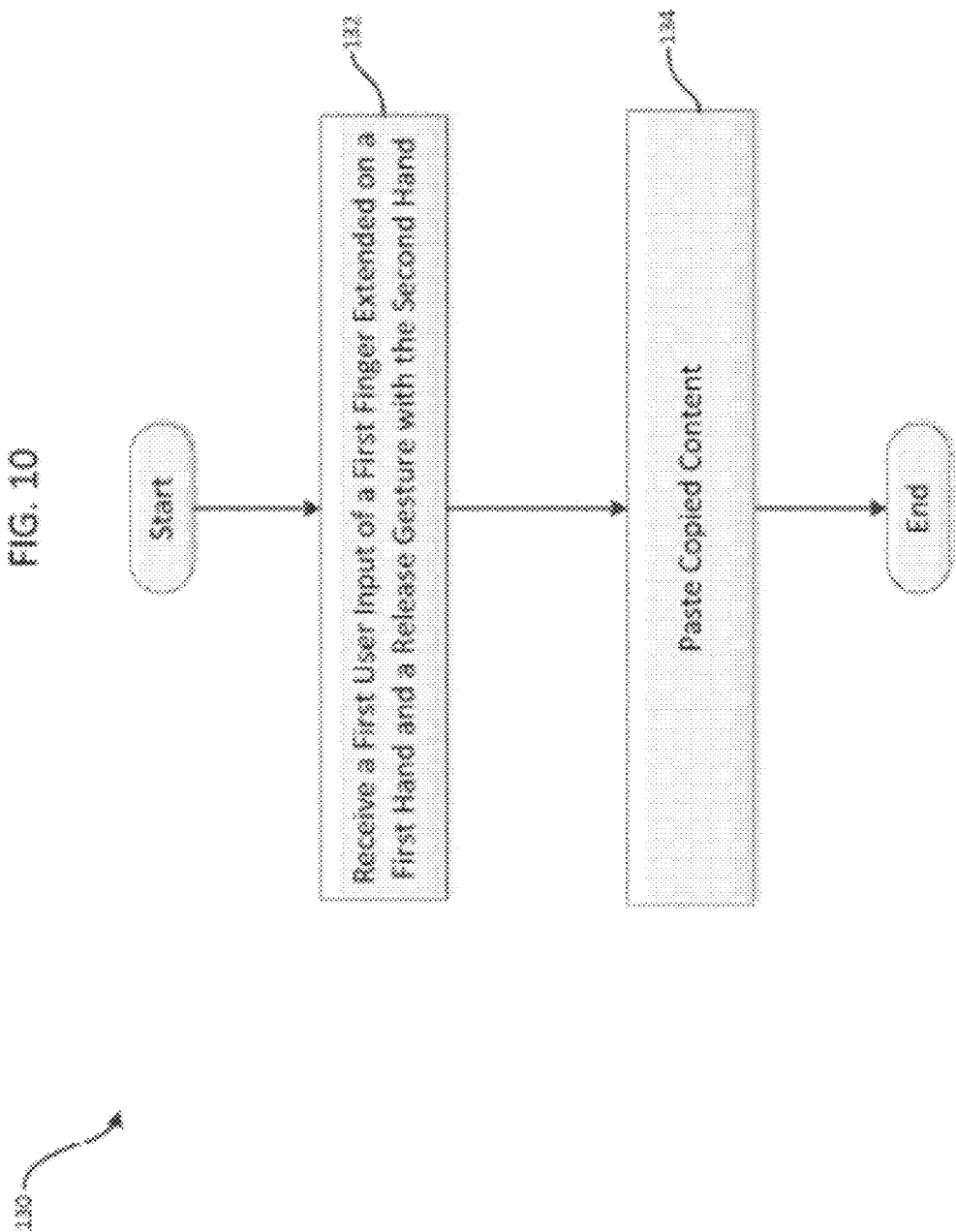
FIG. 10 is a flowchart illustrating processing steps for pasting copied content.

FIG. 10 is a flowchart illustrating processing steps 130 for executing a gesture to paste copied content. In step 132, the smart desk 2 can receive a first user input of a first finger extended on a first hand and a release gesture with a second hand. Alternatively, a user of the smart desk 2 can make a release gesture with a first hand without requiring a finger to be extended. The release gesture can be executed with all five fingers starting as a closed first and then extending the fingers open as if the user is releasing copied content or "throwing" the copied content. The smart desk 2 can make a sound to provide feedback to the user that the paste command has been executed. An example of this can be a "slap" or similar sound.

The copy gesture and paste gesture can be programmed to be complimentary gestures. For example, if a user "grabs" selected content to copy it, the user can then release his or her first to paste the selected content in one smooth motion. The smart desk 2 can also allow the user to "drop" the copied content by releasing his or her fist.

Figure 11:
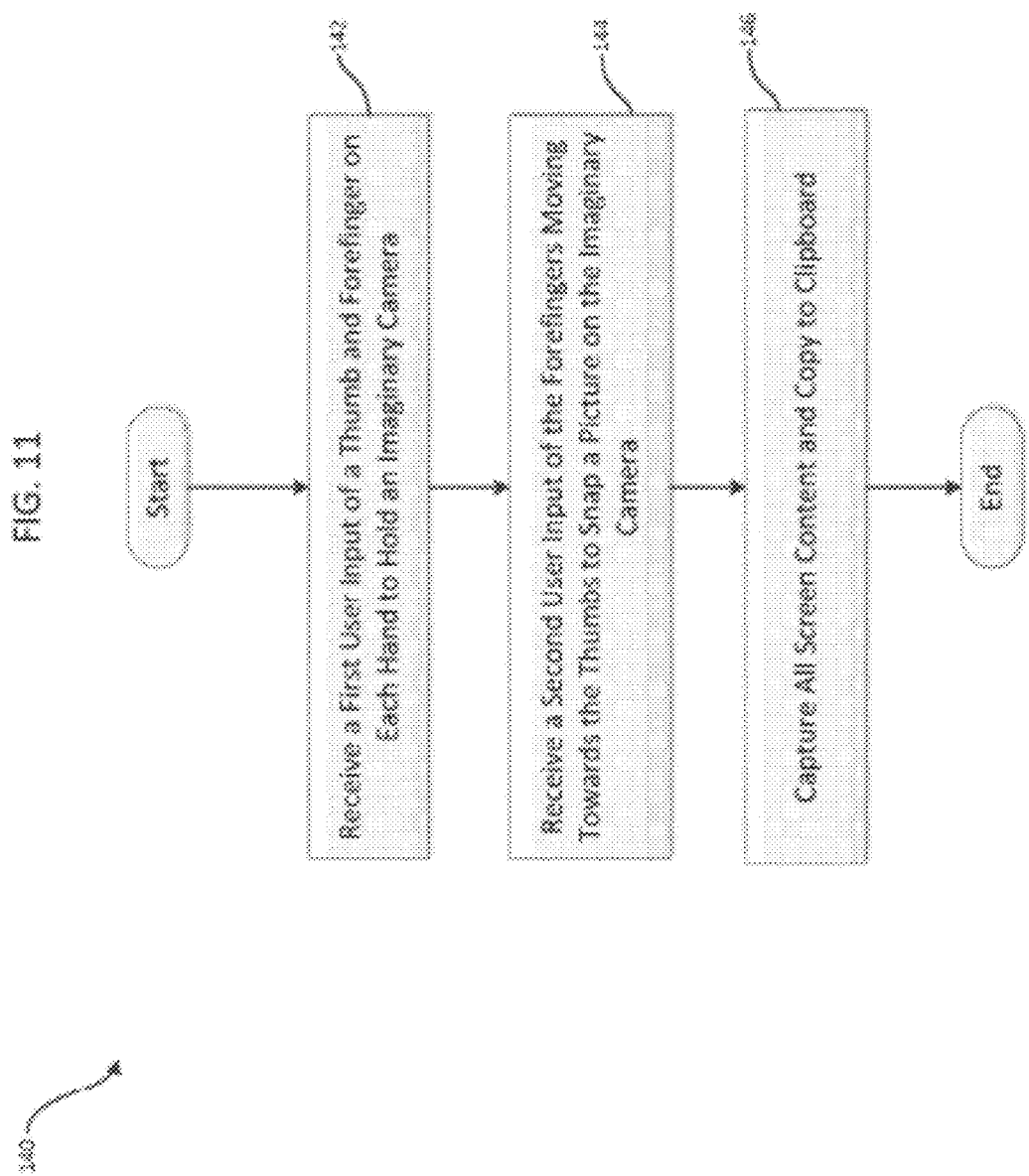
FIG. 11 is a flowchart illustrating processing steps for taking a screenshot.

FIG. 11 is a flowchart illustrating processing steps 140 for executing a gesture to take a screenshot by capturing all screen content and copying it to the clipboard. In step 142, the smart desk 2 receives a first user input of a thumb and forefinger on each hand positioned as if the user is holding an imaginary camera. Alternatively, other fingers can be used to make a shape of an imaginary camera. In step 144, the smart desk 2 receives a second user input of the forefingers moving toward the thumbs as if the user snapping a picture with the imaginary camera. As noted above, other fingers or motions can be used to indicate that an imaginary camera is being snapped. One finger to make the snapping motion can also be used. In step 146, the smart desk takes a screenshot by capturing all screen content and copying it to the clipboard.

Figure 12:
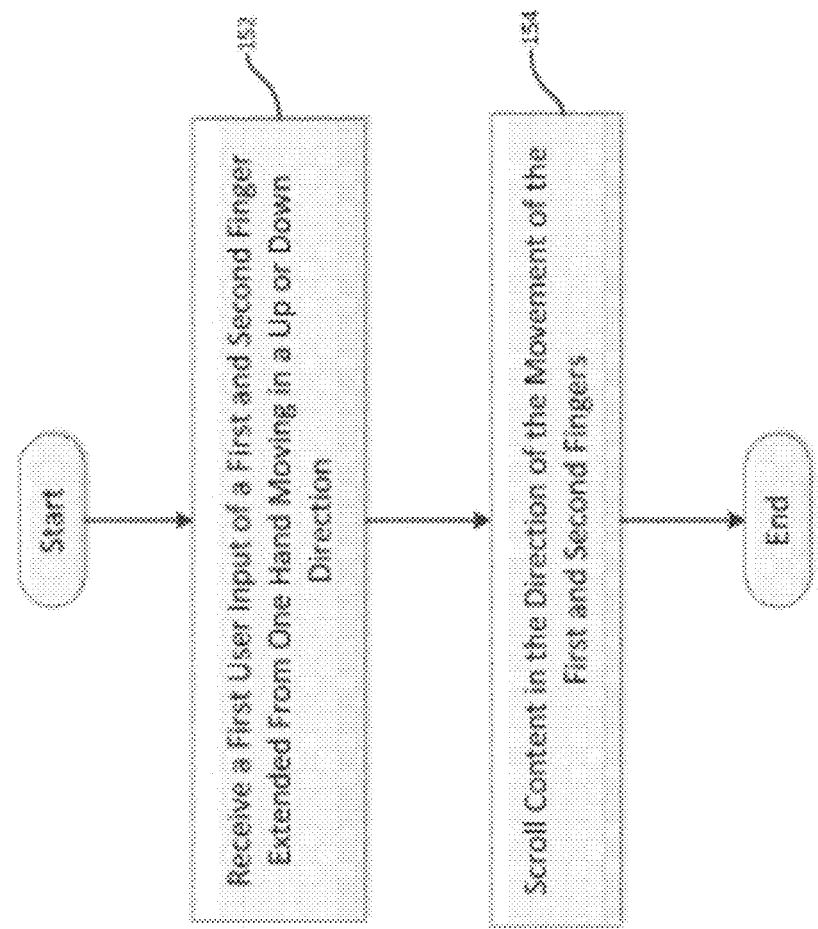
FIG. 12 is a flowchart illustrating processing steps for scrolling.

FIG. 12 is a flowchart illustrating processing steps 150 for executing a gesture to scroll content on the smart desk. In step 152, the smart desk 2 receives a first user input of a first and second finger extended from one hand moving in a up or down direction. Alternatively, the smart desk 2 can require any number of fingers to execute this gesture. In step 154, the smart desk scrolls content in the direction of the movement of the first and second fingers. This gesture functions as if a user is using a wheel of a mouse or scroll bar on an application to move up or down in a document. However, with this touchless gesture, a user can sit back in his or her chair and scroll through a document without having to interact with a keyboard or mouse. Accordingly, this gesture does not require a user to interact with the touchscreens of the smart desk 2. The direction of the scroll based on upward or downward movement can be set by the user based on preference. The scroll gesture can move upward or downward in a fluid way such that the fingers can move up or down contemporaneously and smoothly without having to reset his or her fingers.

Figure 13:
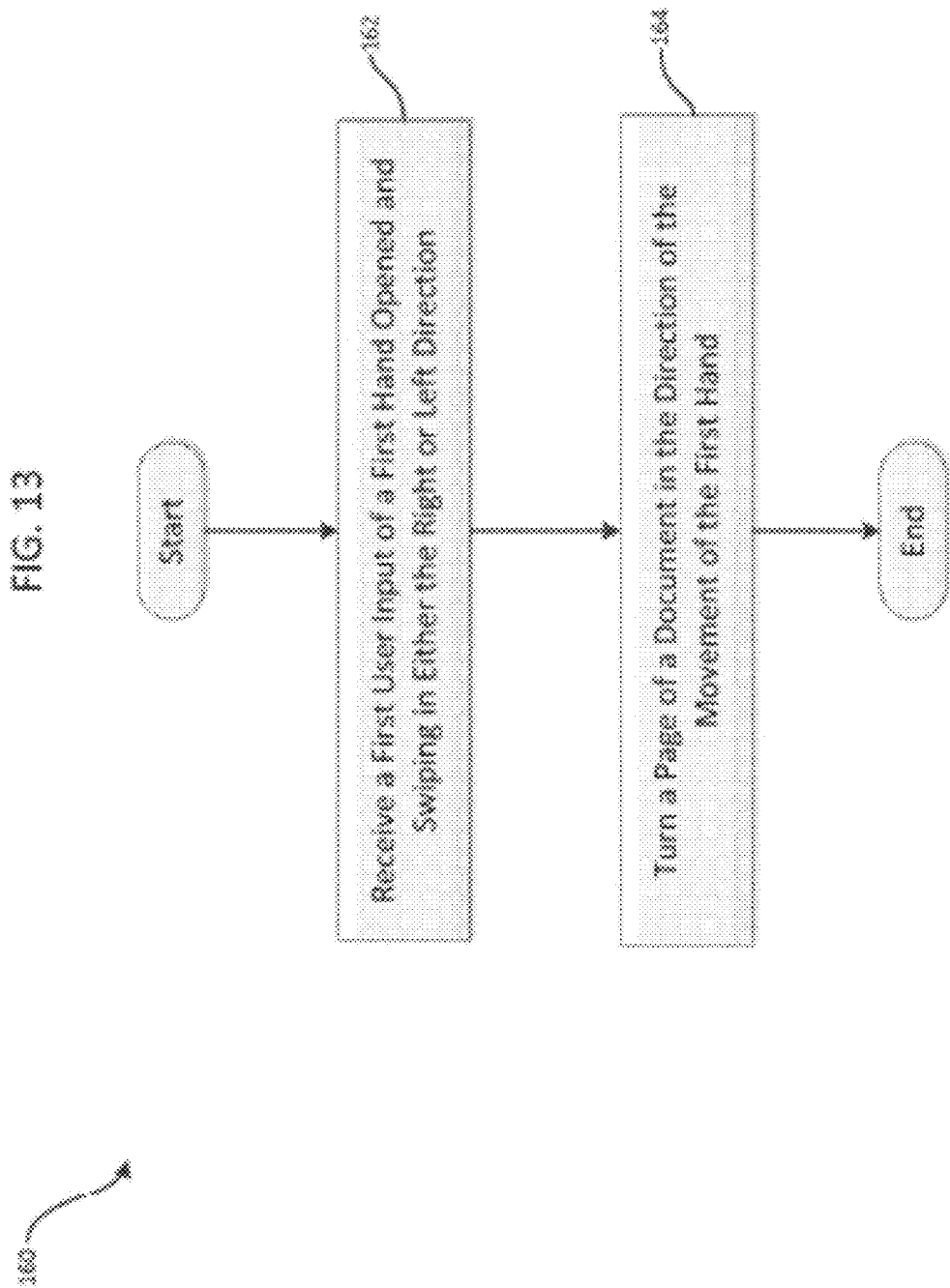
FIG. 13 is a flowchart illustrating processing steps for turning a page.

FIG. 13 is a flowchart illustrating processing steps 160 for executing a gesture to turn a page in a document. In step 162, the smart desk receives a first user input of a first hand opened and swiping in either the right or left direction as if the user is swiping pages of a book. Any number of fingers can be extended to execute this gesture. In step 164, the smart desk 2 turns a page of a document in the direction of the movement of the first hand. The smart desk 2 can allow a user to set his or her preference as to which direction turns a page forward and backward. The smart desk 2 can be programmed to turn a page forward where the user moves his hand from right to left and to turn a page backward where the user moves his hand from left to right as if the user is actually turning a page in a book. As noted above, the user can change this preference if desired.

The page forward and backward gestures can be complimentary gestures in that a user can execute these motions contemporaneously without having to reset his or her hands. In essence these gestures can provide a sense of fluidity for a user to page forward and backward in one constant set of motions without interruption.

Figure 14:
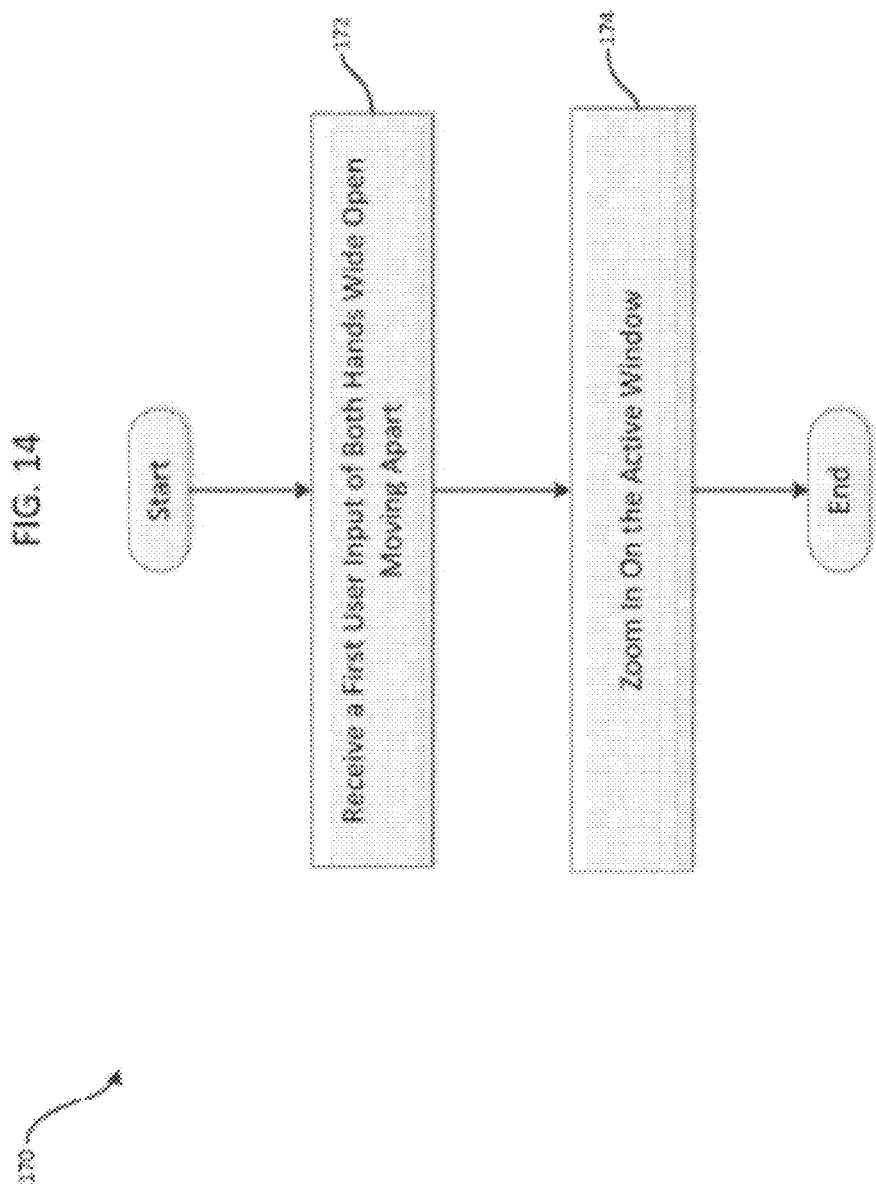

FIG. 14 is a flowchart illustrating processing steps 170 for zooming in on an active window. In step 172, the smart desk 2 receives a first user input of both hands of a user wide open and moving apart. In step 174, the smart desk 2 zooms in on the active window. This gesture can be performed by other similar mechanisms indicating that a user wants to zoom in on a document. For example, the user can use two fingers and move them apart instead of wide open hands.

FIG. 15 is a flowchart illustrating processing steps 180 for zooming out on an active window. In step 182, the smart desk 2 receives a first user input of both hands of a user wide open and moving together. In step 184, the smart desk 2 zooms out on the active window. This gesture can be performed by other similar mechanisms indicating that a user wants to zoom out on a document. For example, the user can use two fingers and move them closer together instead of wide open hands.

The zoom in and out gestures can be complimentary gestures in that a user can execute these motions contemporaneously without having to reset his or her hands. In essence these gestures can provide a sense of fluidity for a user to zoom in and out in one fluid motion to achieve the desired zoom.

FIG. 16 is a drawing which illustrates a haptic response system 190 of a key 192 of the virtual keyboard 24 of the smart desk 2. As can be seen in FIG. 16, the "J" key 192 is shown as an example, but each key on the virtual keyboard 24 can be similarly designed. Each key on the virtual keyboard 24 can be designed with an enhanced haptic feedback system where pressing the key closer to the target (e.g., the letter J as shown in FIG. 16) provides a greater degree of haptic feedback. For example, if the user presses the key 192 within a first area 194, the smart desk 2 provide a first haptic response. If the user presses the key 192 within a second area 196 but also outside the first area 194, the smart desk 2 provides a second haptic response. If the user presses within a third area 198 but outside of the second area 196 and the first area 194, the smart desk 2 provides a third haptic response. If the user presses down outside of the third area 198, then no haptic response can be provided by the smart desk 2. The closer the user's typing stroke is to the key 192, the greater the haptic response can be. For example, the first haptic response can be a 100 percent, the second haptic response can be 60 percent and the third haptic response can be 30 percent. This provides a user with enhanced feedback as to the accuracy of the keystrokes and the location in which the keystrokes are occurring which allows the user to use a virtual keyboard as if it is a physical keyboard, and type at the speed the user types on the physical keyboard.

The virtual keyboard 24 of the smart desk 2 can include a first sensing mechanism for determining where a user presses on the virtual keyboard 24. The first sensing mechanism can determine which key a user presses on the virtual keyboard 24. The first sensing mechanism can have the appropriate degree of sensitivity to determine in close proximity whether a user intended to press a particular key over any of the other adjacent keys on the virtual keyboard 24. The first sensing mechanism can use infrared sensors, or any other sensors known in the art. The virtual keyboard 24 can also include a second sensing mechanism to determine whether a user intended to press a key or whether the user is merely resting his or her finger(s) on the key. Accordingly, the virtual keyboard 24 can include a plurality of pressure sensors to make this determination.

All of the above touch and touchless gestures described in connection with FIGS. 2-15 can be programmed on the operating system (e.g., Windows 10) running on the smart desk 2. This allows the gestures to be performed and executed on any application seamlessly.

Figure 17:
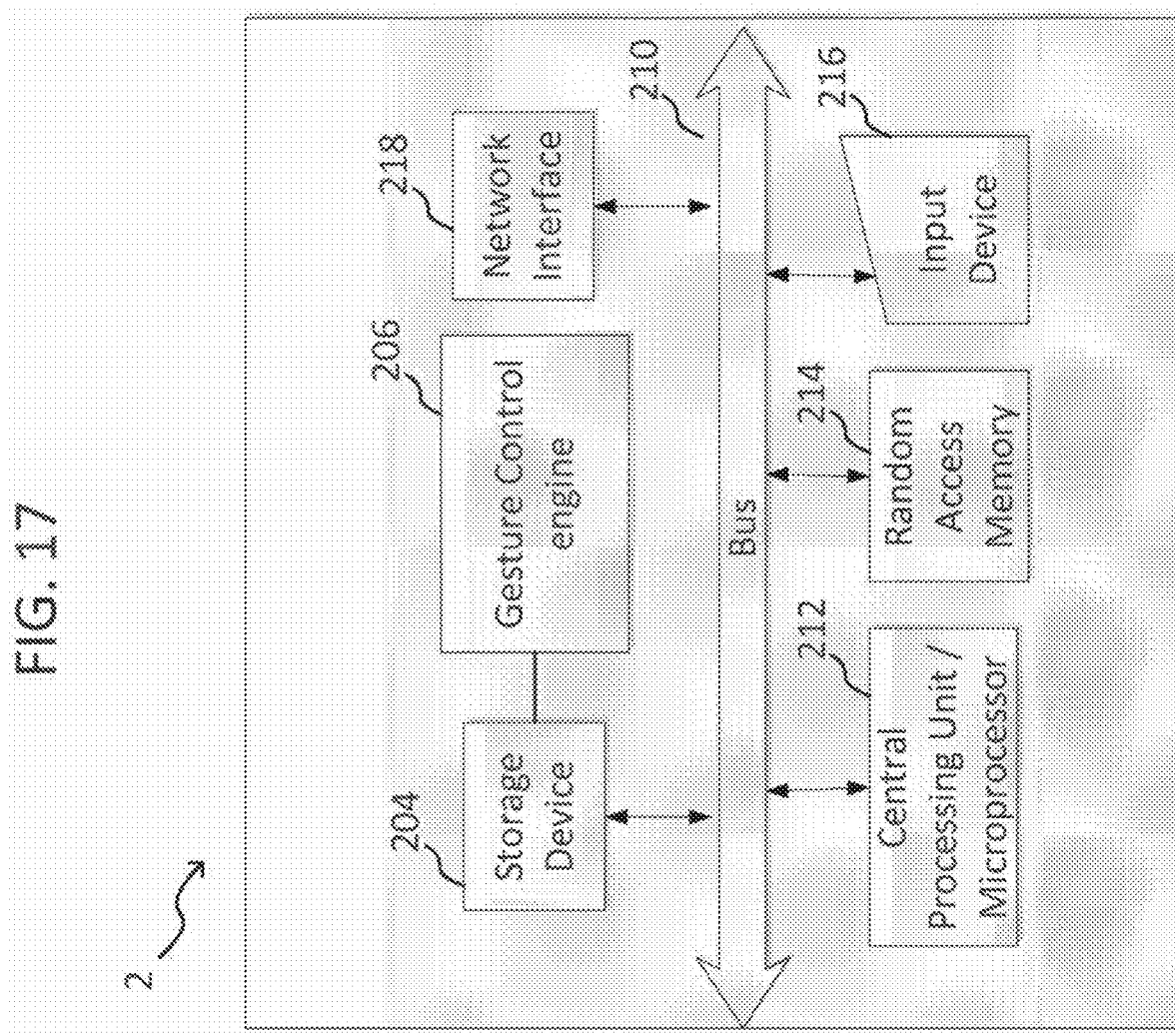
FIG. 17 is a diagram illustrating example hardware and software components of the smart desk.

FIG. 17 is a diagram illustrating example hardware and software components of the smart desk 2. The smart desk 2 could include a storage device 204, a network interface 218, a communications bus 210, a central processing unit (CPU) (microprocessor) 212, a random access memory (RAM) 214, and one or more input devices 216, such as a keyboard, mouse, etc. The smart desk 2 could also include a touch displays (e.g., liquid crystal display (LCD), cathode ray tube (CRT), etc.) as described in greater detail above. The storage device 204 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The functionality provided by the present disclosure could be provided by a gesture control engine 206, which could be embodied as computer-readable program code stored on the storage device 204 and executed by the CPU 212 using any suitable, high or low level computing language, such as Python, Java, C, C++, C#, .NET, MATLAB, etc. The network interface 218 could include an Ethernet network interface device, a wireless network interface device, or any other suitable device which permits the smart desk 2 to communicate via the network. The CPU 212 could include any suitable single- or multiple-core microprocessor of any suitable architecture that is capable of implementing and running the gesture control engine 206 (e.g., Intel processor). The random access memory 214 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A smart desk comprising:
a touch display including a first display half and a second display half;
one or more processors; and
memory storing instructions that, when executed by the one or more processors, cause the smart desk to:
(i) receive a first touch user input, the first touch input comprising a touch with a plurality of fingers and hold in a first location on the touch display;
(ii) determine, based on the first touch user input indicating a first touch on the touch display, a selection of a content item;
(iii) receive a second touch user input indicating a second touch on the touch display, the second touch comprising a tap located in a second location on the touch display;
(iv) determine, based on receiving the second touch user input after the first touch user input, and based on the second touch being received while the first touch is received, to display the content item on one of the first display half or the second display half of the touch display based on a relative positional relationship between the second touch user input comprising the tap and the first touch user input comprising the touch with the plurality of fingers and hold; and
(v) display the content item on the one of the first display half or the second display half of the touch display, wherein the first touch is held in the first location on the touch display, and the second touch is the tap located in the second location on the touch display.

2. The smart desk of claim 1, wherein the first touch user input includes the first touch on the selected content item with the plurality of fingers and holding the first touch on the selected content item with the at plurality of fingers, and the second touch is the tap with at least one other finger.

3. The smart desk of claim 2, wherein the first display half is a right half of the touch display, and wherein the selected content item is moved to the right half of the touch display when the at least one other finger is tapped to the right of the plurality of fingers.

4. The smart desk of claim 2, wherein the second display half is a left half of the touch display, and wherein the selected content item is moved to the left half of the touch display when the at least one other finger is tapped to the left of the plurality of fingers.

5. The smart desk of claim 2, wherein the display of the content item on the one of the first display half or the second display half of the touch display includes expanding the content item on the one of the first display half or the second display half of the touch display.

6. The smart desk of claim 2, wherein the display of the content item on the one of the first display half or the second display half of the touch display includes maximizing the content item on the one of the first display half or the second display half of the touch display.

7. The smart desk of claim 1, wherein the display of the selected content item on the one of the first display half or the second display half of the touch display when the second touch user input occurs between a first predetermined distance and a second predetermined distance from the first touch user input.

8. The smart desk of claim 1, wherein the instructions are programmed on an operating system level so that the instructions can be executed on any application running on the operating system of the smart desk.

9. A smart desk comprising:
a touch display;
one or more processors, wherein the one or more processors are configured for running a first application and a second application; and
memory storing instructions that, when executed by the one or more processors, cause the smart desk to:
(i) receive a first touch user input on the touch display, the first touch user input comprising a three finger touch input;
(ii) receive a second touch user input on the touch display;
(iii) determine, based on receiving the second touch user input after the first touch user input, and based on the second touch user input being received while the first touch user input is received, to switch from the first application to the second application; and
(iv) switch from the first application to the second application,
wherein the first touch user input and the second touch user input are located anywhere on the touch display.

10. The smart desk of claim 9, wherein the first touch user input includes the first touch on the touch display with three fingers and holding the first touch on the touch display with the three fingers, and the second touch is a tap with at least one other finger.

11. The smart desk of claim 9, wherein the first touch user input is received anywhere on the touch display.

12. The smart desk of claim 9, wherein the second touch user input is received anywhere on the touch display.

13. The smart desk of claim 9, wherein the instructions are programmed on an operating system level so that the instructions can be executed on any application running on the operating system of the smart desk.

* * * * *